(12) United States Patent
Lipka et al.

(10) Patent No.: US 10,511,023 B2
(45) Date of Patent: Dec. 17, 2019

(54) FLUORINATED COAL DERIVED CARBONS AND ELECTRODES FOR USE IN BATTERY SYSTEMS AND SIMILAR

(71) Applicant: University of Kentucky Research Foundation, Lexington, KY (US)

(72) Inventors: Stephen M. Lipka, Lexington, KY (US); Christopher R. Swartz, Lexington, KY (US)

(73) Assignee: UNIVERSITY OF KENTUCKY RESEARCH FOUNDATION, Lexington, KY (US)

( * ) Notice: Subject to any disclaimer, the term of this patent is extended or adjusted under 35 U.S.C. 154(b) by 0 days.

(21) Appl. No.: 15/592,510

(22) Filed: May 11, 2017

(65) Prior Publication Data

US 2017/0331111 A1    Nov. 16, 2017

Related U.S. Application Data

(60) Provisional application No. 62/334,770, filed on May 11, 2016.

(51) Int. Cl.
| | | |
|---|---|---|
| *H01M 4/133* | (2010.01) | |
| *H01M 4/38* | (2006.01) | |
| *H01M 4/583* | (2010.01) | |
| *H01M 4/587* | (2010.01) | |
| *H01M 4/62* | (2006.01) | |
| *H01M 4/1393* | (2010.01) | |

(52) U.S. Cl.
CPC ....... *H01M 4/5835* (2013.01); *H01M 4/1393* (2013.01); *H01M 4/382* (2013.01); *H01M 4/625* (2013.01); *C01B 2202/20* (2013.01)

(58) Field of Classification Search
CPC .. H01M 4/1393; H01M 4/382; H01M 4/5835; H01M 4/625; C01B 2202/20; C01B 31/0253
See application file for complete search history.

(56) References Cited

U.S. PATENT DOCUMENTS

| | | | | |
|---|---|---|---|---|
| 2,709,183 | A * | 5/1955 | Farlow | C07C 17/007 204/165 |
| 4,791,038 | A * | 12/1988 | Shia | H01M 4/583 423/489 |
| 2004/0013933 | A1 * | 1/2004 | Korshunov | H01M 4/133 429/231.7 |
| 2007/0281213 | A1 * | 12/2007 | Pyszczek | H01M 4/06 429/231.7 |

OTHER PUBLICATIONS

Li, et al, The tunable electrochemical performances of carbon fluorides/manganese dioxide hybrid cathodes by their arrangements. Journal of Power Sources 274 (2015) 1292-1299.

(Continued)

*Primary Examiner* — Brittany L Raymond
(74) *Attorney, Agent, or Firm* — King & Schickli, PLLC

(57) ABSTRACT

An electrode including fluorinated and surface defluorinated coal is described, as well as methods of producing such and employing such within an electrical system. The coal in the electrodes is fluorinated at an amount of between 0.3 and 1.4. The resulting coal products can be further surface defluorinated and maintain functionality within an electrical system.

9 Claims, 7 Drawing Sheets

(56) References Cited

OTHER PUBLICATIONS

Ahmad, et al., Pushing the theoretical limit of Li—CFx batteries using fluorinated nanostructured carbon nanodiscs. Carbon 94 (2015) 1061-1070.
Madria, et al., Ionic liquid electrolytes for lithium batteries: Synthesis, electrochemical, and cytotoxicity studies. Journal of Power Sources 234 (2013) 277-284.
Cheng, et al., Facile Controlled Synthesis of MnO2 Nanostructures of Novel Shapes and Their Application in Batteries. Inorg. Chem. 2006, 45, 2038-2044.
Trent, V., et al., Chemical Analyses and Physical Properties of 12 Coal Samples from the Pocahontas Field, Tazewell County, Virginia, and McDowell County, West Virginia, Geological Survey Bulletin 1528, U.S. Govt. Printing Office 1982.
WVa-USA.com page: http://www.wva-usa.com/history/mthope/coke.php; accessed Oct. 12, 2018.
Bowen, B., et al., Coal Characteristics presentation, Indiana Center for Coal Technology Research (CCTR), Purdue University, Oct. 2008.
Tiwari, M., et al., Elemental characterization of coal, fly ash, and bottom ash using an energy dispersive X-ray fluorescence technique; Applied Radiation and Isotopes 90 (2014) pp. 53-57.
Patra, K.C., et al., Elemental analysis of coal and coal ASH by PIXE technique, Applied Radiation and Isotopes 70 (2012) 612-616.
Fletcher, Thomas H., Relationships Between Coal Chemistry and Decomposition Products; GCEP Meeting, Provo, UT; Mar. 15, 2005 (27 pp).
Matthews, Jonathan P., et al., The structural alignment of coal and the analogous case of Argonne Upper Freeport coal; Fuel 95 (2012); pp. 19-24.
Liu, Zhenjian, et al., Surface Properties and Pore Structure of Anthracite, Bituminous Coal and Lignite; Energies 2018, 11, 1502.
Chapter 2: Coal Deposits and Properties, lecture notes from che.utexas.edu/course/che359&384/lecture_notes (25 pp); date unknown.
Bowen, Brian H., et al., Coal Characteristics, Indiana Center for Coal Technology Research; Oct. 2008 (28 pp.).

\* cited by examiner

FLUORINATED COAL DERIVED CARBONS AND ELECTRODES FOR USE IN BATTERY SYSTEMS AND SIMILAR

RELATED APPLICATION

This application claims priority to U.S. Provisional Application 62/334,770, filed May 11, 2016, which is hereby incorporated by reference in its entirety.

TECHNICAL FIELD

This document relates to electrodes composed of fluorinated and surface defluorinated coal, as well as to electrical systems utilizing said electrodes.

BACKGROUND SECTION

Carbon is an attractive material for use within lithium battery systems to the accepted standard of manganese dioxide due to the potential to improve performance. However, costs associated with developing fluorinated carbon particles have to date hindered any practical development for the consumer market making them cost prohibitive.

Coal is an abundant source and cheap source of carbon, but other elements present within coal render it impractical as a viable carbon source for many commercial applications. The costs associated with purifying carbon from coal similarly hinder the use coal. In electrical systems, carbon is abundantly utilized for its conductive properties. With coal, however, the presence of other elements, such as sulphur, nitrogen, oxygen and hydrogen are too disruptive to allow coal to be utilized. The present invention has identified an approach that nullifies these adverse effects and allows coal to function as a carbon source in electrical applications.

SUMMARY OF THE INVENTION

In accordance with the purposes described herein, the present invention provides in part for a composition of fluorinated coal particles. The coal particles include fluorinated carbon that is fluorinated at a ratio of between about 0.3 and 1.4 to 1 carbon. The coal particles may have a mean width of about 400 nm and 20 μm.

In some embodiments, the coal particles may further have their exterior surface defluorinated.

The present invention also provides for an electrode formed from the coal particles. The electrode may be formed with a binder. In some embodiments, the coal particles may form a hybrid electrode with $MnO_2$ (manganese dioxide) and SVO (silver vanadium oxide).

The present invention also provides for a battery system with a cathode comprised of the fluorinated and/or surface defluorinated coal particles described herein. The battery system may use a lithium or sodium based electrolyte, along with a corresponding lithium or sodium based anode.

The present invention also provides in part for methods of formulating the coal particles described herein, comprising grinding coal to a particulate, filtering to select the desired width range of particles, heat treating and fluorinating. The methods may further comprise defluorinating the exterior surface of the coal particles.

BRIEF DESCRIPTION OF THE DRAWINGS

The accompanying drawing figures incorporated herein and forming a part of the specification, illustrate several aspects of the present embodiments and together with the description serve to explain certain principles of those embodiments. In the drawings.

Figure 1:
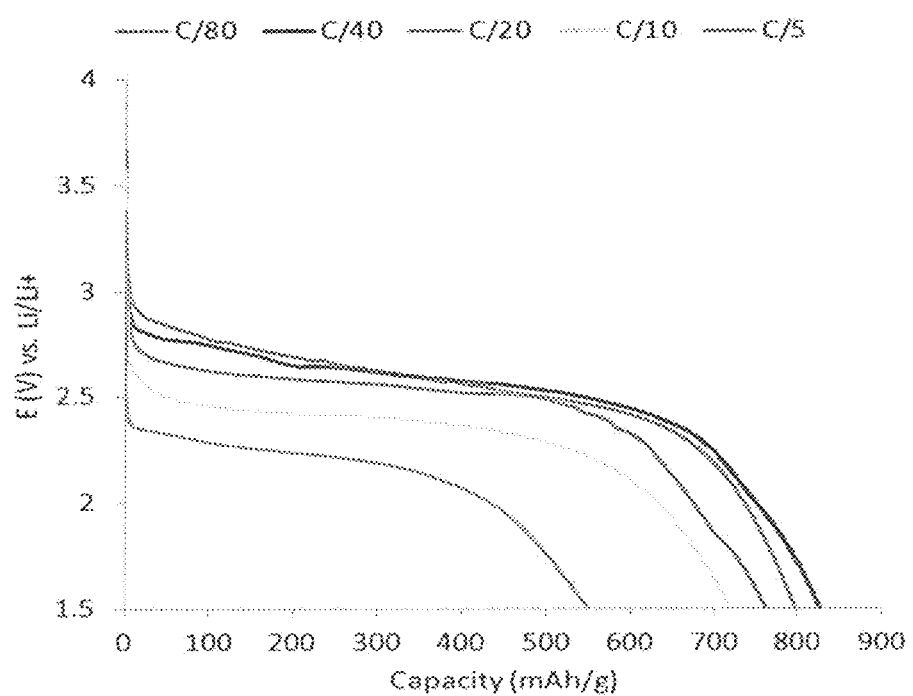
FIG. 1 shows the discharge performance of fluorinated anthracite coal ($CF_{1.09}$) at five different discharge rates, including C/80, C/40, C/20, C/10, and C/5. The electrolyte was 0.5M $LiBF_4$ in 2:8 PC/DME, and the electrode composition was 85% $CF_{1.09}$, 5% carbon black, and 10% Teflon 6C.

Reference will now be made in detail to the present preferred embodiments, examples of which are illustrated in the accompanying drawings.

DETAILED DESCRIPTION

The present invention provides for fluorinated and surface defluorinated coal particles. The process of fluorination is established, see, e.g. Ahmad, Y. et al. *Carbon.* 2015, 94, 1061. The particles can have a mean diameter of between about 400 nm and 20 μm. The particles may be prepared by mining coal or obtaining mined coal, grinding the coal into particulate, heat treating the particulate coal in an inert atmosphere, such as $N_2$ or Ar, and then fluorination. Following fluorination, the CFx coal particles can optionally undergo solvothermal treatment to remove excess F from the exterior surface of the coal particles to improve performance. The coal particles can be derived from anthracite, bituminous and sub-bituminous coals or combinations thereof. Following grinding, the coal particles may be optionally selected for a desired average width, such as between about 400 nm and 20 μm.

The present invention provides, in part, for fluorinated coal particles (CFx coal particles), wherein the particles are fluorinated at a ratio to carbon of between about 0.3 and 1.4 to 1. For example, the coal particles may comprise between about $CF_{0.3}$ to $CF_{1.4}$. In some instances, the coal particles may comprise about $CF_{1.09}$. Fluorination of the coal particles can be controlled by the amount of reaction time, as well as other components, such as concentration of reactant fluoride, temperature, pressure and volume of the reaction.

The fluorinated coal particles may be further surface defluorinated. Based on the CFx coal particles synthesized as described herein, an optional surface de-fluorination process under mild hydrothermal condition may be applied to further modify the surface of CFx coal particles used to prepare electrodes. (see, e.g., Dai, Y. et al. *Journal of Materials Chemistry A.* 2014, 2 (48), 20896-20901.). The fluorination of coal particles is complete throughout the particle. However, as noted in the demonstrations described herein, surface defluorination of the coal particles can offer further advantages while still providing the advantages observed with the fully fluorinated product. This optional step doesn't significantly affect the overall mass, but may further improve the high rate performance of the electrode by removing excess, low conductivity F from the surface of the coal particles, thereby rendering them more conductive and dramatically improving the discharge rate. Thus, surface defluorination of coal particles can improve performance when used as a cathode in a battery system, such as in a Li-CFx or Na-CFx battery described herein.

The present invention also provides for electrodes comprising the fluorinated and/or surface defluorinated coal particles described herein. The particles can be formed into an electrode of a desired shape and utilized in a battery system. The electrodes may further comprise a binder such as Teflon to hold the particles together. The binder may be present at between 3 and 15 weight percent of the electrode. Other binder materials such as PVdF (polyvinylidene fluoride) and CMC (carboxymethyl cellulose) can be used.

The coal particles described herein can also be formed in a hybrid cathode formulation (or mixture) containing CFx-MnO2 and/or CFx-SVO (silver vanadium oxide) and operated as a primary battery containing a lithium (Li) or sodium (Na) based battery anode. The ratio or mixture of materials in the cathode would depend for the mostly based on the desired application. Mixtures of $MnO_2$ and CFx are becoming commonplace and are also driven by cost (CFx is expensive compared to MnO2 but has higher capacity). $MnO_2$, present in a battery system in the form of nanowires, provides a higher discharge rate performance than CFx, for example. CFx and mixtures with MnO2 and SVO provide an option to get the best of all materials, namely achieving both high energy and high power. In the case of a hybrid cathode, the maximum capacity of the electrode is the sum of the individual capacities and the mix ratio is the mix ratio is the ratio of the individual capacities, such that the cathode capacity is equal to $C_{total}=(C_{MnO2} \times W_{MnO2}+C_{CFx} \times W_{CFx})/(W_{MnO2}+W_{CFx})$; where, $W_{MnO2}$ and $W_{CFx}$ are the mass of the $MnO_2$ and $CF_x$ cathode materials, respectively.

The hybrid cathode may further comprise additional features such as a binder and/or other carbonaceous material, e.g. CNTs, graphene, hydrothermally dehydrated carbon particles. Collectively, the CFx and MnO2 and/or SVO may comprise between 80 and 90% by weight of the cathode. The CFx may comprise between about 20 to 95% by weight of the cathode. MnO2 and/or SVO may comprise between about 20 to 80% by weight of the cathode (see, e.g., US Pub. App. 20150311532, incorporated by reference herein in its entirety).

The Li-CFx and Na-CFx batteries are exemplary types of battery system that offers very high-energy density, long-storage life, very good safety record, a wide temperature operating range, and very low self-discharge. For example, Li-CFx batteries possess the highest theoretical energy density among commercially available primary lithium batteries at 2180 Wh/kg, with a long storage life of >20 years, low self-discharge rate of <0.5% per year, and wide temperature operating range between −40° C. and 170° C.

The CFx coal particles may further be combined with other carbonaceous material in forming an electrode, such as activated carbon, carbon nanotubes, graphite, graphene, hydrothermally dehydrated carbon and fullerenes. The CFx coal particles may be utilized in one or both electrodes within a battery system. The battery system may utilize a lithium or sodium based electrolyte. The battery system may use either lithium-based electrolytes for Li—$CF_x$, and sodium-based electrolytes for Na—$CF_x$ primary batteries. Typical salts that can be utilized in these systems include $LiBF_4$, $LiPF_6$, and $NaPF_6$. Typical organic solvents that are employed in these systems include carbonates (ethylene carbonate, dimethyl carbonate), esters (methyl propionate, γ-butyrolactone), ethers (1,2-dimethoxyethane, 1,3-dioxolane), and other polar solvents (dimethylsulfoxide, acetonitrile). In addition, ionic liquids can also be utilized as electrolytes for primary Li—$CF_x$ or Na—$CF_x$ battery systems under higher temperature conditions (see Madria, N. et al. *Journal of Power Sources.* 2013, 234, 277-284.)

Utilization of the CFx coal particles as an electrode or part thereof within a battery system provide capacities much higher than the sum value of each component measured at the same rate. For example, a hybrid CFx coal particle/other carbonaceous (e.g. carbon nanotubes (CNTs)) material cathode within a Li—MnO2 nanowire battery system integrates both the superior rate performance of MnO2 nanowires and the higher specific capacity of CFx active materials, and avoids shortcomings, such as low discharge rate capability and voltage delay (see, e.g., Kijima et al., J. Solid State Chem., 178: 2741, 2005; and Cheng et al., *Inorganic Chemistry*, 45(5): 2038, 2006). Most importantly, such a hybrid configuration of the cathode greatly improves the high rate discharge performance.

EXAMPLES

Figure 6:
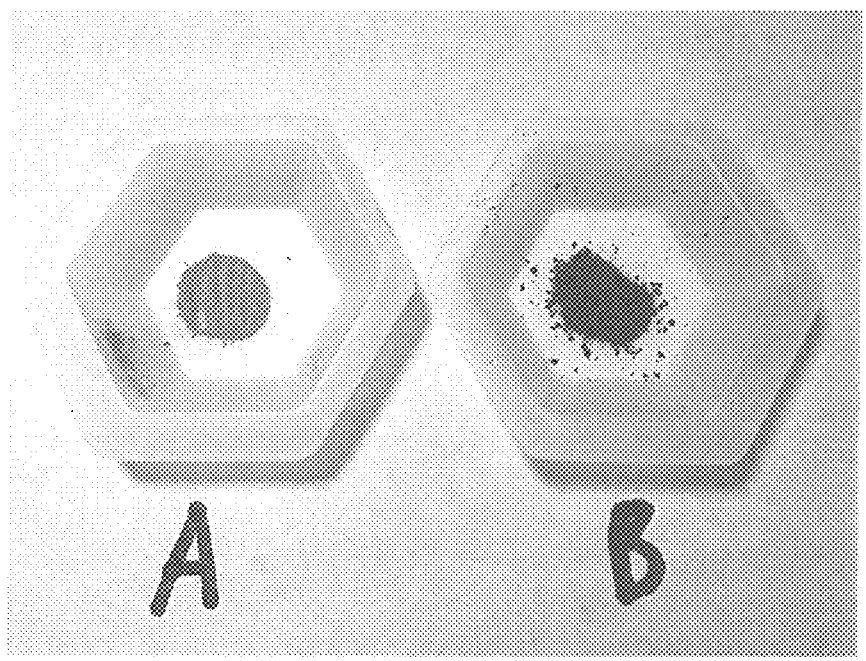
FIG. 6 shows comparative images of fluorinated coal particles (FIG. 6A) and surface defluorinated coal particles (FIG. 6B).

Fluorinated coal particles (particle size: 1-10 microns) were prepared by obtaining ground, milled, and previously mined anthracite coal, graphitized (note: the anthracite particles had already been ground and milled to a particle size range of ~1-10 microns, (submicron particles also can be used) and the particles were graphitized in the temperature range of 2000-2700° C. prior to fluorination). at 2000° C. to 2700° C. under argon, and then fluorinated to a C/F ratio of 1/1.244. FIG. 6(a) shows images of fluorinated $CF_{1.09}$ coal particles. The particles can further be defluorinated. according to the methodology of Dai et al., by heating fluorinated anthracite coal in alkaline ethanol/water mixtures at 180° C. for 1-2 hours. FIG. 6(b) is an image of defluorinated $CF_{1.09}$ particles. The defluorination as per Dai, et. Al., was used but we believe that there are hydrothermal conditions (T, chemistry, etc.) that would work as well but have not explored these. The CFx particles were determined to be fluorinated at a ratio to carbon of 1.09:1. [The degree of fluorination is a function of the reaction conditions utilized during the fluorination process, including fluorination temperature, time, and ratio of fluorine gas to carbonaceous material]. The CFx coal particles were formed into electrodes with 10% Teflon as a mechanical binder, and 5% carbon black to serve as a conductive additive and added in the percentages presented in table 1 and assessed in a lithium battery system for capacity and discharge voltage. Table 1, along with FIG. 1, shows that increased $CF_{1.09}$ (fluorinated anthracite coal; 10% Teflon) offers useful discharge capacity and discharge voltage.

TABLE 1

| C rate | Capacity (@ 1.5 V vs. Li/Li+); mAh/g | Avg. discharge voltage (V; vs. Li/Li+) |
|---|---|---|
| C/80 | 762 | 2.49 |
| C/40 | 828 | 2.50 |
| C/20 | 798 | 2.50 |
| C/10 | 719 | 2.40 |
| C/5 | 549 | 2.28 |

Figure 2:
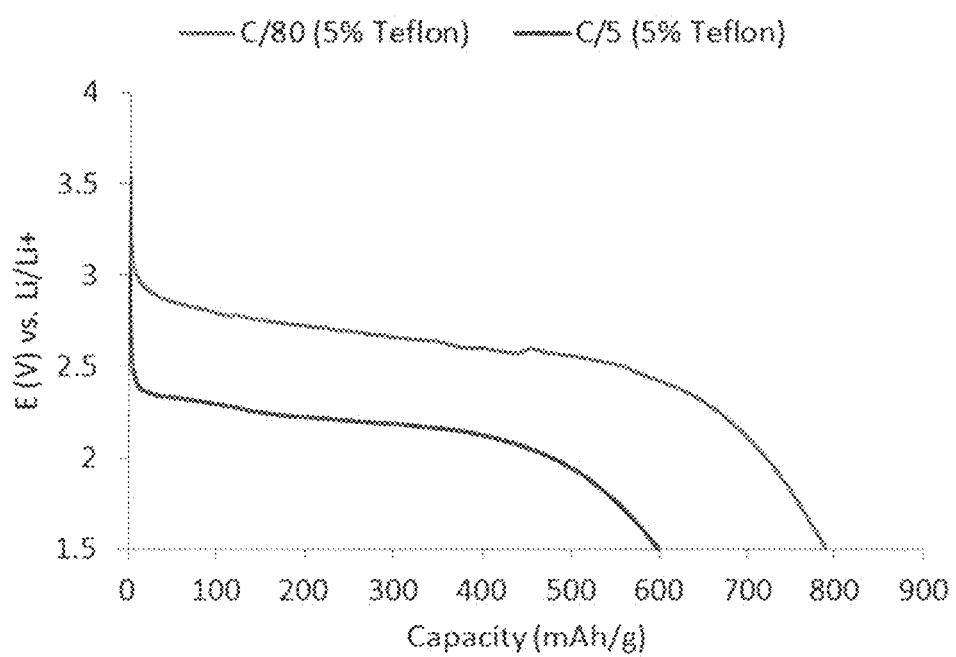
FIG. 2 shows two discharge curves of fluorinated anthracite coal ($CF_{1.09}$) at two different discharge rates (C/80, C/5). The electrolyte was 0.5M $LiBF_4$ in 2:8 PC/DME, and the electrode composition was 85% $CF_{1.09}$, 10% carbon black, and 5% Teflon 6C.

Next, CFx coal particles were utilized in electrodes with 5% teflon at the percent amount listed in Table 2 and assessed in a lithium battery system. Table 2, along with FIG. 2, shows that the $CF_{1.09}$ (fluorinated anthracite coal; 5% Teflon) offer comparable capacity and voltage discharge despite the halving of Teflon present.

TABLE 2

| C rate | Capacity (@ 1.5 V vs. Li/Li+); mAh/g | Avg. discharge voltage (V; vs. Li/Li+) |
|---|---|---|
| C/80 | 791 | 2.54 |
| C/5 | 599 | 2.35 |

Figure 3:
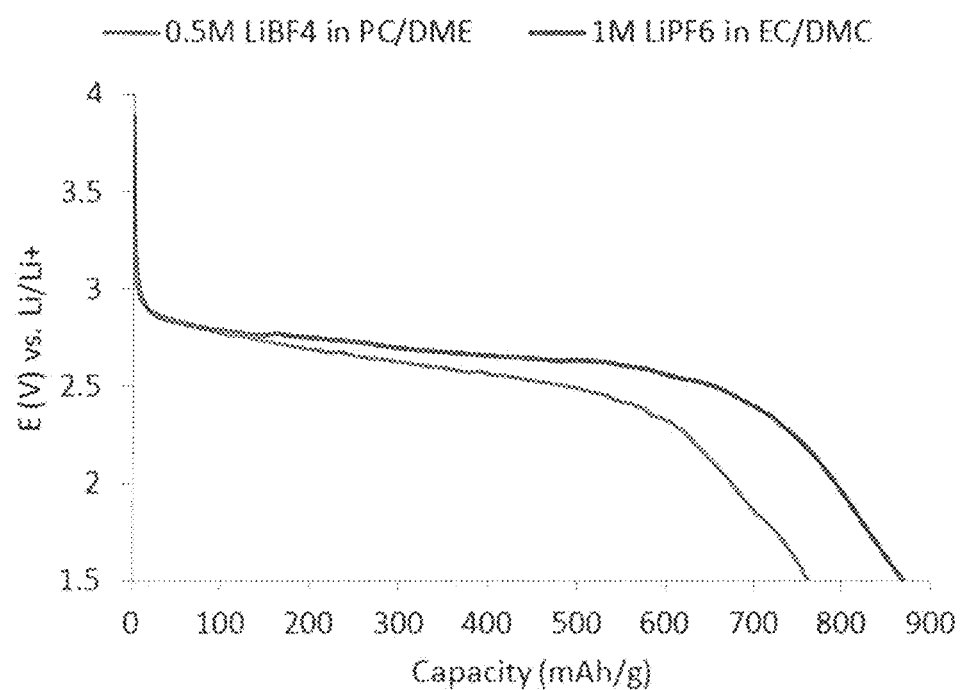
FIG. 3 shows a comparison of two discharge curves (discharge rate=C/80) for fluorinated anthracite coal ($CF_{1.09}$) in two different electrolytes; 0.5M $LiBF_4$ in PC/DME, and 1M $LiPF_6$ in EC/DMC. the electrode composition was 85% $CF_{1.09}$, 5% carbon black, and 10% Teflon 6C.

It was next examined how the $CF_{1.09}$ coal particles would perform in the presence of different electrolytes. Table 3, along with FIG. 3, shows that the $CF_{1.09}$ coal particles can achieve higher discharge capacities and higher average discharge voltages in the 1M $LiPF_6$ electrolyte.

TABLE 3

| electrolyte | Capacity (@ 1.5 V vs. Li/Li+); mAh/g | Avg. discharge voltage (V; vs. Li/Li+) |
|---|---|---|
| 0.5M $LiBF_4$ | 762 | 2.49 |
| 1M $LiPF_6$ | 870 | 2.56 |

Figure 4:
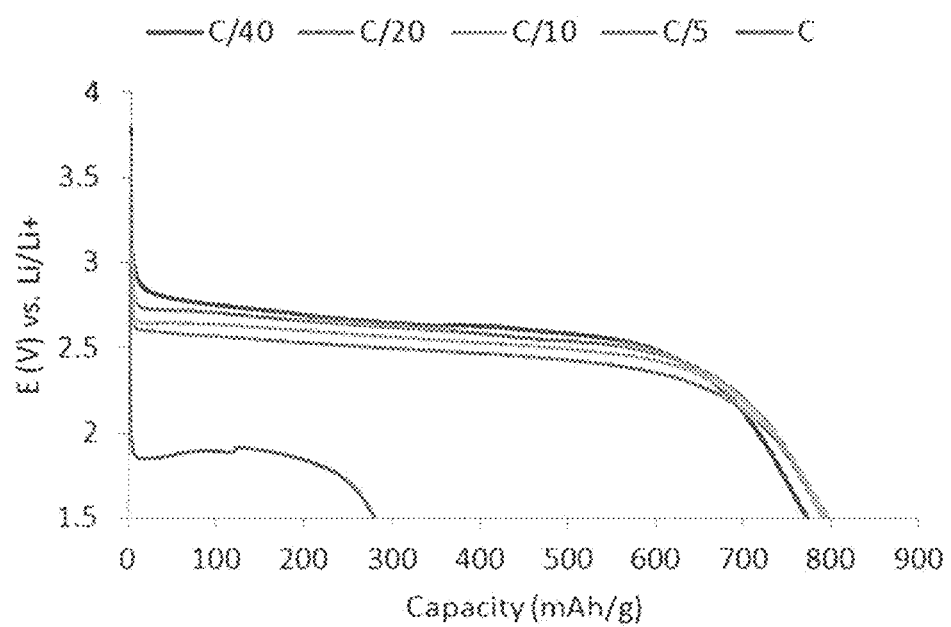
FIG. 4 shows the discharge performance of fluorinated anthracite coal ($CF_{1.09}$) in 1M $LiPF_6$ (EC/DMC) at five different discharge rates: C/40, C/20, C/10, C/5, and C. The electrode composition was 85% $CF_{1.09}$, 5% carbon black, and 10% Teflon 6C.
Figure 5:
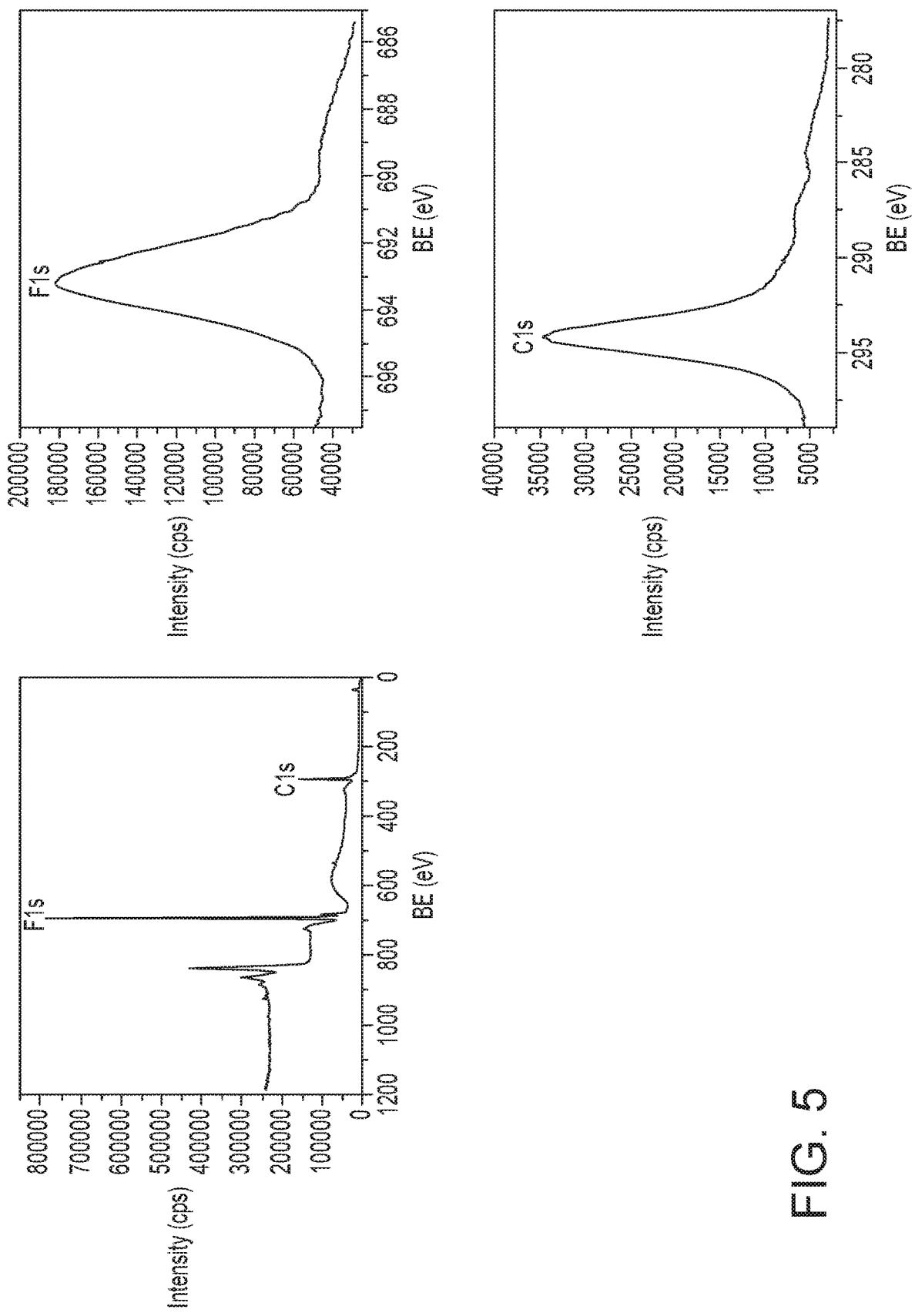
FIG. 5 shows data obtained by XPS (x-ray photoelectron spectroscopy) that was used to determine the elemental composition of the fluorinated anthracite coal. The elemental composition was determined to be $CF_{1.09}$.

Table 4, along with FIG. 4, shows $CF_{1.09}$ (fluorinated anthracite coal; 10% Teflon 6C, 5% carbon black) can achieve excellent discharge capacities and average discharge voltages to a discharge rate of C/5, with a noticeable decrease in cell performance metrics at higher discharge rates (C), leading to reduced discharge capacities and average discharge voltage.

TABLE 4

| C rate | Capacity (@ 1.5 V vs. Li/Li+); mAh/g | Avg. discharge voltage (V; vs. Li/Li+) |
|---|---|---|
| C/40 | 774 | 2.57 |
| C/20 | 799 | 2.55 |
| C/10 | 791 | 2.52 |
| C/5 | 795 | 2.48 |
| C | 280 | 2.01 |

Figure 7:
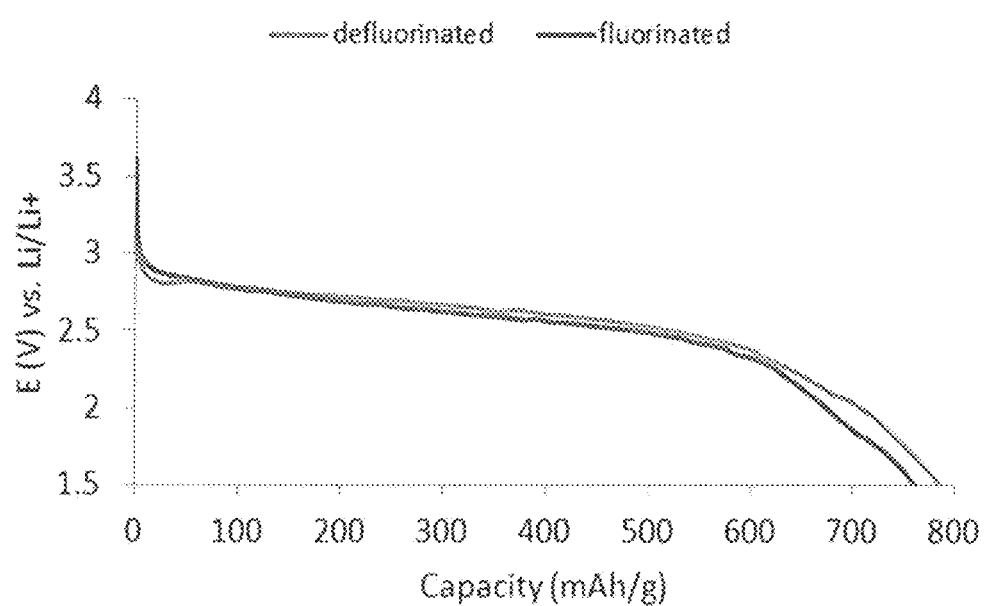
FIG. 7 shows a comparative graph of capacity and voltage discharge between fluorinated and defluorinated coal particles within lithium battery systems.

It was next assessed how surface defluorination of the particles would affect capacity and voltage discharge. Table 5, along with FIG. 7, shows a comparison of fluorinated vs. defluorinated coal, demonstrating the surface defluorination can further increase overall performance.

TABLE 5

| sample | Capacity (@ 1.5 V vs. Li/Li+); mAh/g | Avg. discharge voltage (V; vs. Li/Li+) |
|---|---|---|
| defluorinated | 786 | 2.51 |
| fluorinated | 762 | 2.49 |

Table 6 shows the discharge performance characteristics of primary Li cells prepared with a hybrid CFx/MnO2 cathode at different compositions. Carbon nanotubes (CNT) are used in the cathode compositions as an additional conductive additive. The cathode compositions are given in terms of weight % of each component and the CNTs are held constant at 10% for each cathode formulation. The discharge rates range from C/5 to 5C. These data illustrate what effect the various ratios of MnO2 and CFx have on capacity, energy density and power density. Coal fluorinated and surface defluorinated particles, given their comparable performance would be expected to provide similar results.

TABLE 6

Discharge Characteristics

| Cathode Composition | C Rate | Current (mA) | Mean Point Voltage (V) | Capacity (mAh/g) | Energy Density (Wh/kg) | Power Density (W/kg) |
|---|---|---|---|---|---|---|
| $MnO_2$: 63% | C/5 | 99.3 | 2.34 | 424 | 992 | 232 |
| $CF_x$: 27% | 1C | 496 | 2.11 | 344 | 726 | 1047 |
| CNT: 10% | 2C | 993 | 2.04 | 330 | 673 | 2026 |
| $C_{Theory}$: | 3C | 1489 | 1.94 | 288 | 559 | 2889 |
| 496.4 | 4C | 1986 | 1.87 | 269 | 503 | 3714 |
| mAh/g | 5C | 2482 | 1.74 | 259 | 451 | 4319 |
| $MnO_2$: 45% | C/5 | 124 | 2.31 | 460 | 1063 | 286 |
| $CF_x$: 45% | 1C | 622 | 2.10 | 421 | 884 | 1306 |
| CNT: 10% | 2C | 1244 | 2.03 | 390 | 792 | 2525 |
| $C_{Theory}$: | 3C | 1866 | 1.94 | 386 | 749 | 3620 |
| 622 mAh/g | 4C | 2488 | 1.74 | 335 | 583 | 4329 |
|  | 5C | 3110 | 1.63 | 280 | 456 | 5069 |
| $MnO_2$: 27% | C/5 | 150 | 2.40 | 593 | 1423 | 360 |
| $CF_x$: 63% | 1C | 748 | 2.11 | 548 | 1156 | 1578 |
| CNT: 10% | 2C | 1495 | 2.02 | 503 | 1016 | 3020 |
| $C_{Theory}$: | 3C | 2243 | 1.99 | 475 | 945 | 4464 |
| 747.6 | 4C | 2990 | 1.86 | 442 | 822 | 5561 |
| mAh/g | 5C | 3738 | 1.67 | 270 | 451 | 6242 |

The foregoing has been presented for purposes of illustration and description. It is not intended to be exhaustive or to limit the embodiments to the precise form disclosed. Obvious modifications and variations are possible considering the above teachings. All such modifications and variations are within the scope of the appended claims when interpreted in accordance with the breadth to which they are fairly, legally and equitably entitled. All literature cited herein, including patent and non-patent literature is hereby incorporated by reference in its entirety.

What is claimed:

1. An electrode comprising fluorinated coal particles, wherein said particles comprise fluorinated carbon at a ratio of between about $CF_{0.3}$ and $CF_{1.4}$.

2. The electrode of claim 1, wherein the mean width of said particles is between about 400 nm and 20 µm.

3. The electrode of claim 1, wherein the exterior surface of said particles is defluorinated.

4. The electrode of claim 1, further comprising a binder.

5. The electrode of claim 1, further comprising $MnO_2$ (manganese dioxide) and SVO (silver vanadium oxide).

6. A battery system comprising the electrode of claim 1.

7. The battery system of claim 6, further comprising a lithium or sodium based electrolyte.

8. The battery system of claim 6, wherein the electrode is a cathode.

9. The battery system of claim 6, further comprising an anode comprised of lithium or sodium.

* * * * *